(12) United States Patent
Steeby

(10) Patent No.: US 6,375,596 B1
(45) Date of Patent: Apr. 23, 2002

(54) CONTROL TO DETERMINE INPUT SHAFT DIRECTION OF ROTATION

(75) Inventor: Jon A. Steeby, Schoolcraft, MI (US)

(73) Assignee: Eaton Corporation, Cleveland, OH (US)

( * ) Notice: Subject to any disclaimer, the term of this patent is extended or adjusted under 35 U.S.C. 154(b) by 36 days.

(21) Appl. No.: 09/660,134

(22) Filed: Sep. 12, 2000

(51) Int. Cl.[7] ................... B60K 41/28; F16D 48/10
(52) U.S. Cl. ........................... 477/86; 192/103 F
(58) Field of Search .................... 477/70, 86, 175; 192/3.63, 103 F, 109 F

(56) References Cited

U.S. PATENT DOCUMENTS

| | | | |
|---|---|---|---|
| 4,081,065 A | | 3/1978 | Smyth et al. |
| 4,361,060 A | | 11/1982 | Smyth |
| 4,646,891 A | | 3/1987 | Braun |
| 4,874,070 A | * | 10/1989 | Nellums et al. ............... 477/78 |
| 5,184,506 A | * | 2/1993 | Asada ........................ 73/118.1 |
| 5,737,604 A | * | 4/1998 | Dick .......................... 180/249 |
| 6,071,211 A | | 6/2000 | Liu et al. |
| 6,155,956 A | * | 12/2000 | Hayashi ..................... 192/12 R |

* cited by examiner

Primary Examiner—Charles A Marmor
Assistant Examiner—Ankur Parekh
(74) Attorney, Agent, or Firm—Howard D. Gordon

(57) ABSTRACT

A method/system for controlling an automated mechanical transmission system (10) utilized on a vehicle. To protect from driveline damage due to improper clutch engagement during vehicle launch conditions, the master friction clutch (16) is partially engaged to determine a direction of rotation of the input shaft (18) from the non-directional signal (IS) received from a non-directional speed sensor (36).

11 Claims, 2 Drawing Sheets

CONTROL TO DETERMINE INPUT SHAFT DIRECTION OF ROTATION

BACKGROUND OF THE INVENTION

1. Field of the Invention

The present invention relates to a control system/method for determining the direction of rotation of a shaft, such as a transmission input shaft, being monitored by a non-directional rotational speed sensor. In particular, the present invention relates to a control utilizing a non-directional rotational speed sensor for determining the direction of rotation of a vehicular transmission input shaft drivingly connected to an internal combustion engine, such as a diesel engine, by a selectively engaged and disengaged friction clutch.

2. Description of the Prior Art

Automated mechanical vehicular transmission systems, including an automated mechanical transmission having an input shaft drivingly connected to an internal combustion engine by an automatically operated master friction clutch, are known in the prior art, as may be seen by reference to U.S. Pat. Nos. 4,081,065; 4,361,060 and 5,275,267, the disclosures of which are incorporated herein by reference.

Vehicular clutch control systems for partially engaging a vehicular master friction clutch to a touch point or slipping condition are known in the prior art, as may be seen by reference to U.S. Pat. Nos. 4,646,891 and 6,071,211, the disclosures of which are incorporated herein by reference.

For smooth and rapid engagement of the master clutch during vehicle launch, it is desirable to engage the clutch in a modulated manner to achieve a desired amount of torque transfer and/or slip (i.e., engine speed minus input shaft speed). If the speed of the input shaft is sensed by a non-directional speed sensor, a problem may occur if the vehicle is rolling backward (vehicle rollback on a hill) at start-from-stop. Such a misreading of true directional input shaft speed may lead to rough engagement, undue wear and/or damage to the vehicle drivetrain and/or a false determination of clutch lockup if the rotational velocity of the input shaft happens to be equal but opposite that of the engine.

SUMMARY OF THE INVENTION

In accordance with the present invention, the drawbacks of the prior art are minimized by the provision of a control system/method which will allow a determination of forward or backward direction of rotation of a vehicular transmission input shaft utilizing a non-directional input shaft speed sensor.

The foregoing is accomplished by providing a control which, at start-from-stop conditions, will partially apply the vehicle clutch and determine if the sensed input shaft accelerates or decelerates. If the non-directional input shaft speed decreases, (i.e., if the input shaft decelerates), this is an indication that the input shaft is rotating in the opposite direction than the engine (it is understood that internal combustion engines, when driving, are unidirectional devices and have an idle speed exceeding expected initial input shaft speed). Based upon this determination of correct magnitude and direction of rotational speed, an appropriate engagement sequence may be instituted.

Accordingly, it is an object of the present invention to provide a new and improved control method/system for engaging a master friction clutch in a vehicular automated mechanical transmission system.

This and other objects and advantages of the present invention will become apparent from a reading of the following description of the preferred embodiment taken in connection with the attached drawings.

DESCRIPTION OF THE PREFERRED EMBODIMENT

Figure 1:
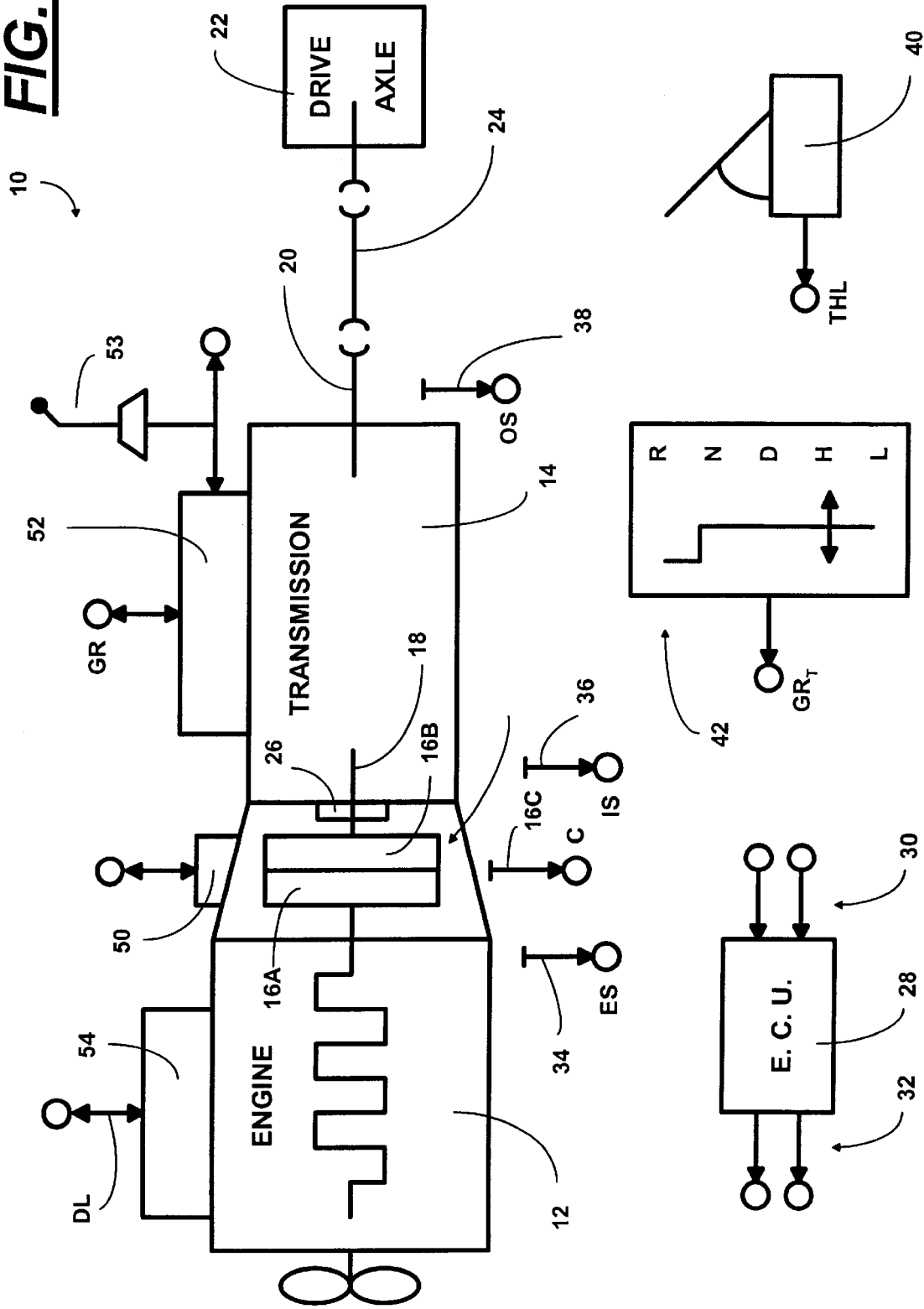
FIG. 1 is a schematic illustration, in block diagram format, of an automated mechanical transmission system utilizing the control of the present invention.

An at least partially automated mechanical transmission system intended for vehicular use is schematically illustrated in FIG. 1. The automated transmission system 10 includes a fuel-controlled engine 12 (such as a well-known diesel engine or the like), a multiple-speed, change-gear transmission 14, and a non-positive coupling 16 (such as a friction master clutch) drivingly interposed between the engine and the input shaft 18 of the transmission. As is known, diesel engines rotate in a single direction, counterclockwise when viewed from the front, and have a preset idle speed (about 600 RPM). The transmission 14 may be of the compound type comprising a main transmission section connected in series with a splitter- and/or range-type auxiliary section. Transmissions of this type, especially as used with heavy-duty vehicles, typically have 6, 7, 8, 9, 10, 12, 13, 16 or 18 forward speeds. Examples of such transmissions may be seen by reference to U.S. Pat. Nos. 5,390,561 and 5,737,978, the disclosures of which are incorporated herein by reference.

A transmission output shaft 20 extends outwardly from the transmission 14 and is drivingly connected with the vehicle drive axles 22, usually by means of a prop shaft 24. The illustrated master friction clutch 16 includes a driving portion 16A connected to the engine crankshaft/flywheel and a driven portion 16B coupled to the transmission input shaft 18 and adapted to frictionally engage the driving portion 16A. See U.S. Pat. Nos. 5,634,541; 5,450,934 and 5,908,100. An upshift brake 26 (also known as an input shaft brake or inertia brake) may be used for selectively decelerating the rotational speed of the input shaft 18 for more rapid upshifting, as is well known. Input shaft or upshift brakes are known in the prior art, as may be seen by reference to U.S. Pat. Nos. 5,655,407 and 5,713,445.

A microprocessor-based electronic control unit (or ECU) 28 is provided for receiving input signals 30 and for processing same in accordance with predetermined logic rules to issue command output signals 32 to various system actuators and the like. Microprocessor-based controllers of this type are well known, and an example thereof may be seen by reference to U.S. Pat. No. 4,595,986 this disclosure of which is incorporated herein by reference.

System 10 includes a rotational speed sensor 34 for sensing rotational speed of the engine and providing an output signal (ES) indicative thereof, a rotational speed sensor 36 for sensing the rotational speed of the input shaft 16 and providing an output signal (IS) indicative thereof, and a rotational speed sensor 38 for sensing the rotational speed of the output shaft 20 and providing an output signal (OS) indicative thereof. A sensor 40 may be provided for sensing the displacement of the throttle pedal and providing an output signal (THL) indicative thereof. A shift control console 42 may be provided for allowing the operator to select an operating mode of the transmission system and for providing an output signal ($GR_T$) indicative thereof.

Rotational speed sensors 34, 36 and 38 typically are non-directional and provide a signal indicative of an absolute value of rotational speed.

As is known, if the clutch is engaged, the rotational speed of the engine may be determined from the speed of the input shaft and/or the speed of the output shaft and the engaged transmission ratio (ES=IS=OS*GR).

System 10 also may include sensors for sensing operation of the vehicle foot brake (also called service brakes) and engine brakes, and for providing signals indicative thereof.

The master clutch 16 is controlled by a clutch actuator 50 responding to output signals from the ECU 28. Alternatively, an actuator responsive to control output signals may be provided, which may be overridden by operation of the manual clutch pedal. The transmission 14 may include a transmission actuator 52, which responds to output signals from the ECU 28 and/or which sends input signals to the ECU 28 indicative of the selected position thereof. Shift mechanisms of this type, often of the so-called X-Y shifter type, are known in the prior art, as may be seen by reference to U.S. Pat. Nos. 5,305,240 and 5,219,391. Actuator 52 may shift the main and/or auxiliary section of transmission 14. A manual shift lever 53 may also be utilized to shift transmission 14. The engaged and disengaged (i.e., "not engaged") condition of clutch 16 may be sensed by a position sensor 16C or may be determined by comparing the speeds of the engine (ES) and the input shaft (IS).

Fueling of the engine is preferably controlled by an electronic engine controller 54, which accepts command signals from and/or provides input signals to the ECU 28. Preferably, the engine controller 54 will communicate with an industry standard data link DL which conforms to well-known industry protocols such as SAE J1922, SAE 1939 and/or ISO 11898. The ECU 28 may be incorporated within the engine controller 54.

When the vehicle is in start-from-rest condition (i.e., vehicle speed slow, in gear, clutch disengaged, throttle released, etc.), engine speed is limited (via J1939 commands or similar data bus) to a small margin above idle speed. For a typical diesel engine governed to a maximum speed of about 2100 RPM, idle speed is about 600 RPM.

As the operator signals a desire to launch the vehicle, usually by increasing throttle pedal displacement, the clutch will move to a "touch point" and then will engage in a modulated manner. Modulated clutch engagement is usually controlled, at least in part, as a function of input shaft speed (IS), slip (ES−IS) and/or rates of changes thereof.

If, at start from step, the vehicle is rolling backwards, rolling downhill, the input shaft and driven clutch discs 16B may be rotating in an opposite direction then is the engine and driving clutch discs 16A.

As an extreme example, as sensor 36 will provide a non-directional signal, an actual speed difference of 1200 RPM (ES=600 RPM CCW and IS=600 RPM CW) may be misinterpreted as a no slip condition (i.e., ES substantially equals IS) which could result in a very rough and/or damaging clutch engagement.

It is therefore desirable to provide a control that can determine a direction of rotation from the non-directional speed signals (IS) provided by input shaft rotational speed sensor 36.

According to the present invention, at start from stop, when (IS) is less than (ES), the clutch 16 is brought to touch point and the non-directional change in input shaft speed is determined. If input shaft speed increases, then the input shaft is rotating in the same direction as the engine. If input shaft speed decreases, then the input shaft is rotating in the opposite direction as the engine.

With the initial direction of rotation of input shaft 18 determined, the control logic can correctly control engagement of clutch 16 to accomplish a vehicle launch.

The control logic ensures that certain requirements are met before engaging the clutch during vehicle launch conditions. The clutch will not be engaged during vehicle launch conditions unless: the transmission is engaged in a gear ratio, the clutch is disengaged, the vehicle speed is less than a first reference value, and the throttle setting exceeds a second reference value. The first reference value may be about 3–5 MPH.

Figure 2:
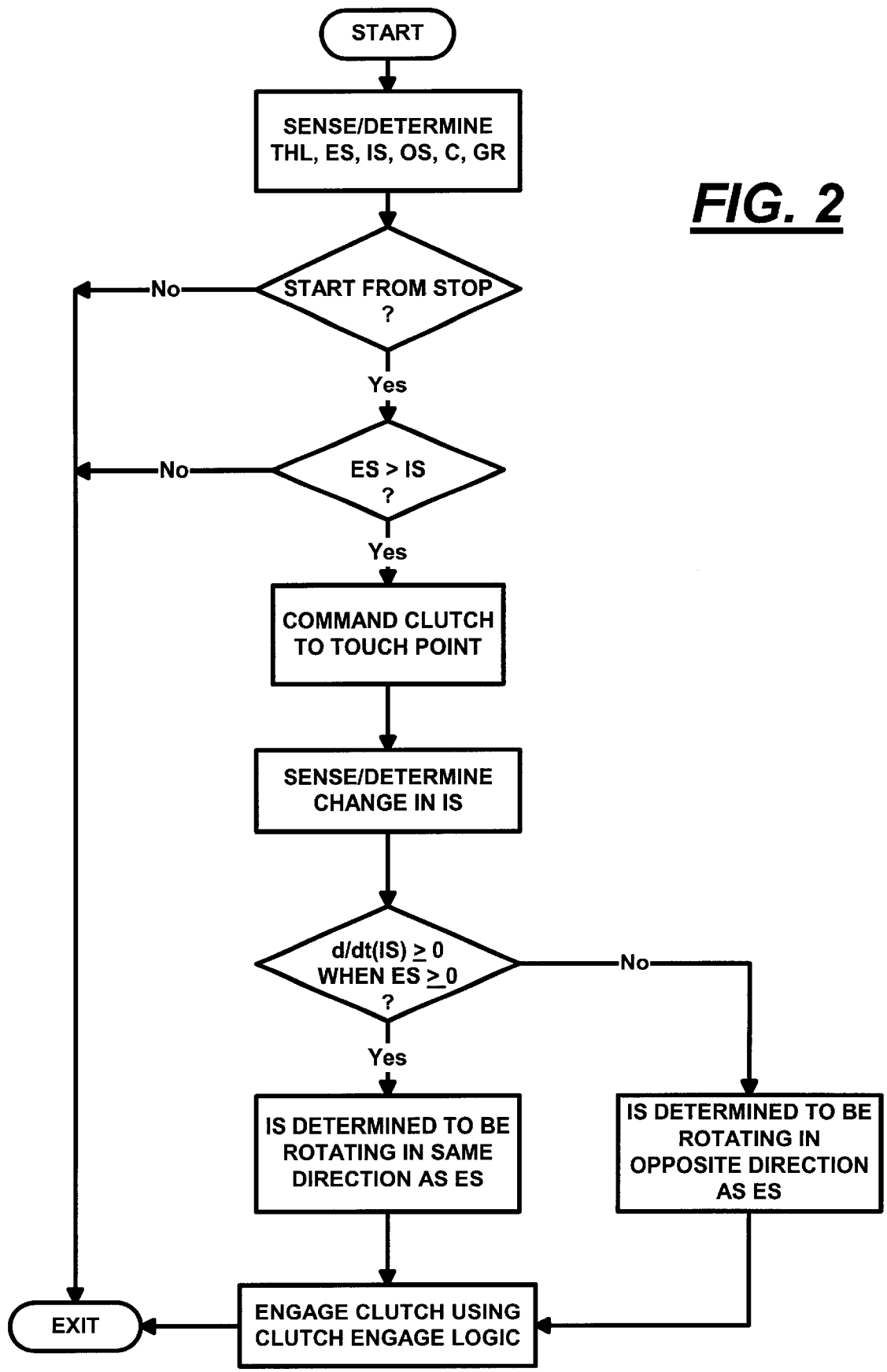
FIG. 2 is a schematic illustration, in flow chart format, of the control of the present invention.

The control of the present invention is shown in flow chart format in FIG. 2. The control logic of the present invention will prevent or minimize driveline shock and rough engagements caused by the clutch control logic misinterpreting signals from the input shaft speed sensor. The control logic of the present invention also enhances vehicle launch while on a grade.

Accordingly, it may be seen that an improved control system/method for controlling starting in an at least partially automated mechanical transmission system is provided.

Although the present invention has been described with a certain degree of particularity, it is understood that the description of the preferred embodiment is by way of example only and that numerous changes to form and detail are possible without departing from the spirit and scope of the invention as hereinafter claimed.

I claim:

1. A method for controlling a vehicular automated transmission system (10) for a vehicle comprising a fuel-controlled engine (12) having a known idle speed ($ES_{IDLE}$) and known direction of rotation, a multiple-speed transmission (14) coupled to the engine by a master friction clutch (16), a clutch control device (50) for controlling said master friction clutch and a controller (28) for receiving input signals (30) including a non-directional signal (IS) indicative of input shaft rotational speed and one or more of signals indicative of engine speed (ES), engaged gear ratio (GR), operator throttle setting (THL), clutch engagement and vehicle speed (OS), and to process said input signals in accordance with with logic rules to issue command output signals (32) to transmission system actuators including said clutch control device, said method comprising:

determining a requirement to engage said clutch during vehicle launch conditions, and, prior to fully engaging said clutch:
(i) causing the master friction clutch to be partially engaged
(ii) sensing the value of said signal indicative of input shaft speed immediately before and after partially engaging said master friction clutch to determine a change in said value caused by partially engaging said master friction clutch; and
(iii) if said change is positive, determining said input shaft is rotating in the same direction of rotation as the engine and, if said change is negative, determining said input shaft is rotating in the opposite direction of rotation as the engine.

2. The method of claim 1 further comprising the step (iv) controlling operation of a said clutch as a function of determined direction of rotation.

3. The method of claim 1 wherein a requirement for engaging said clutch during vehicle launch conditions requires:
  (i) determining that the transmission is engaged in a gear ratio;
  (ii) determining that the clutch is disengaged;
  (iii) determining that vehicle speed is less than a first reference value, and
  (iv) determining that throttle setting exceeds a second reference value.

4. The method of claim 2 wherein a requirement for engaging said clutch during vehicle launch conditions requires:
  (i) determining that the transmission is engaged in a gear ratio;
  (ii) determining that the clutch is disengaged;
  (iii) determining that vehicle speed is less than a first reference value, and
  (iv) determining that throttle setting exceeds a second reference value.

5. The method of claim 3 wherein said first reference ($REF_{SPEED}$) value corresponds to about 3–5 MPH.

6. The method of claim 3 wherein said transmission system (10) includes a position sensor (16C) for sensing engaged and not engaged conditions of said master friction clutch.

7. A control system for controlling a vehicular automated transmission system (10) for a vehicle comprising a fuel-controlled engine (12) having a known idle speed ($ES_{IDLE}$) and known direction of rotation, a multiple-speed transmission (14) coupled to the engine by a master friction clutch (16), a clutch control device (50) for controlling said master friction clutch and a controller (28) for receiving input signals (30) including a non-directional signal (IS) indicative of input shaft rotational speed and one or more of signals indicative of engine speed (ES), engaged gear ratio (GR), operator throttle setting (THL), clutch engagement and vehicle speed (OS), and to process said input signals in accordance with with logic rules to issue command output signals (32) to transmission system actuators including said clutch control device, said logic rules including rules effective for:
  determining a requirement to engage said clutch during vehicle launch conditions, and, prior to fully engaging said clutch:
    (i) causing the master friction clutch to be partially engaged
    (ii) sensing the value of said signal indicative of input shaft speed immediately before and after partially engaging said master friction clutch to determine a change in said value caused by partially engaging said master friction clutch; and
    (iii) if said change is positive, determining said input shaft is rotating in the same direction of rotation as the engine and, if said change is negative, determining said input shaft is rotating in the opposite direction of rotation as the engine.

8. The control system of claim 7 controlling operation of a said clutch as a function of a determined direction of rotation wherein said logic rules further comprise effective rules effective for determined direction of rotation.

9. The control system of claim 8 wherein a requirement for engaging said clutch during vehicle launch conditions requires:
  (i) determining that the transmission is engaged in a gear ratio;
  (ii) determining that the clutch is disengaged;
  (iii) determining that vehicle speed is less than a first reference value, and
  (iv) determining that throttle setting exceeds a second reference value.

10. The control system of claim 9 wherein said first reference ($REF_{SPEED}$) value corresponds to about 3–5 MPH.

11. The control system of claim 9 wherein said automated transmission system (10) includes a position sensor (16C) for sensing engaged and not engaged conditions of said master friction clutch.

* * * * *